United States Patent [19]

Sakamura et al.

[11] Patent Number: 5,327,542
[45] Date of Patent: Jul. 5, 1994

[54] DATA PROCESSOR IMPLEMENTING A TWO'S COMPLEMENT ADDRESSING TECHNIQUE

[75] Inventors: Ken Sakamura, Tokyo; Toyohiko Yoshida, Itami, both of Japan

[73] Assignee: Mitsubishi Denki Kabushiki Kaisha, Japan

[21] Appl. No.: 89,383

[22] Filed: Jul. 8, 1993

Related U.S. Application Data

[63] Continuation of Ser. No. 601,601, Oct. 18, 1990, abandoned, which is a continuation of Ser. No. 171,982, Mar. 23, 1988, abandoned.

[30] Foreign Application Priority Data

Sep. 30, 1987 [JP] Japan .................................. 62-246626

[51] Int. Cl.⁵ ........................ G06F 9/34; G06F 12/00
[52] U.S. Cl. ...................... 395/400; 364/955; 364/955.2
[58] Field of Search ........................... 395/400, 425

[56] References Cited

U.S. PATENT DOCUMENTS

| | | | |
|---|---|---|---|
| 3,571,803 | 3/1971 | Huttenhoff et al. | 364/900 |
| 3,786,436 | 1/1974 | Zelinski et al. | 364/200 |
| 3,858,183 | 12/1974 | Amdahl et al. | 364/200 |
| 3,924,245 | 12/1975 | Eaton et al. | 364/200 |
| 3,970,999 | 7/1976 | Edward | 364/200 |
| 4,087,856 | 5/1978 | Attanasio | 364/200 |
| 4,089,052 | 5/1978 | Gruner | 395/425 |
| 4,099,242 | 7/1978 | Houston et al. | 364/200 |
| 4,184,201 | 1/1980 | Melberg et al. | 364/200 |
| 4,206,503 | 6/1980 | Woods et al. | 395/400 |
| 4,267,458 | 5/1981 | Uram et al. | 290/40 R |
| 4,296,467 | 10/1981 | Nibby, Jr. et al. | 364/200 |
| 4,296,469 | 10/1981 | Gunter et al. | 364/200 |
| 4,312,034 | 1/1982 | Gunter et al. | 1/1 |
| 4,402,044 | 8/1983 | McDonough et al. | 364/200 |
| 4,451,880 | 5/1984 | Johnson et al. | 364/200 |
| 4,584,666 | 4/1986 | Zolnowsky et al. | 364/900 |
| 4,713,749 | 12/1987 | Magar et al. | 364/200 |
| 4,779,187 | 10/1988 | Letwim | 364/200 |
| 5,021,991 | 6/1991 | MacGregor et al. | 395/650 |

OTHER PUBLICATIONS

Intel Advance Inf. 8036 . . . Intel Corp. 1985.
32-bit MPU Virtual Storage Mngmnt. Nikkei Electronics 1987.
Method of Allocation of Order Bit in a Tip for Tron Sakamura 1987.
Motorola, "M68000 8-/16-/32-Bit Microprocessors User's Manual" 7th Ed., 1989.
Intel Advance Information 8036 High Performance Microprocessor with Integrated Memory Management, Intel Corp., Oct., 1985.
32-bit MPU Virtual Storage Management Diffuses by Means of 68030, Nikkei Electronics, Sep., 1987.
Sakamura, "Method of Allocation of Order Bit in a Tip for TRON," Materials for Realtime Architecture TRON Research Meeting, Oct. 1, 1987.
Motorola, "M68000 8-/16-/32-Bit Micrprocessors User's Manual," 7th Ed., 1989.

*Primary Examiner*—Rebecca L. Rudolph
*Attorney, Agent, or Firm*—Townsend and Townsend

[57] ABSTRACT

The data processor related to the invention accesses memory with an address value which is expressed by signed binary notation expressed by twos compliment, is so constructed that the negative address value having maximum absolute value and the positive address value having the same are not wrapped around each other, is provided with hardware which signed extends the address values expressed by relatively small bit number, and is so constructed that the user area and the supervisor area are separated from each other in accordance with the positiveness and the negativeness of address value, so that the positive and negative address space are allowed to optionally be extended in the direction of the greater absolute value without being split, and extending process of address value is easy, furthermore, the user area and the supervisor area can be judged merely by means of the signed bit denoting either the positiveness or the negativeness, to thereby violation of the access right in the supervisor area under the user mode being able to easily be detected.

4 Claims, 6 Drawing Sheets

32 BITS ADDRESS SPACE    64 BITS ADDRESS SPACE

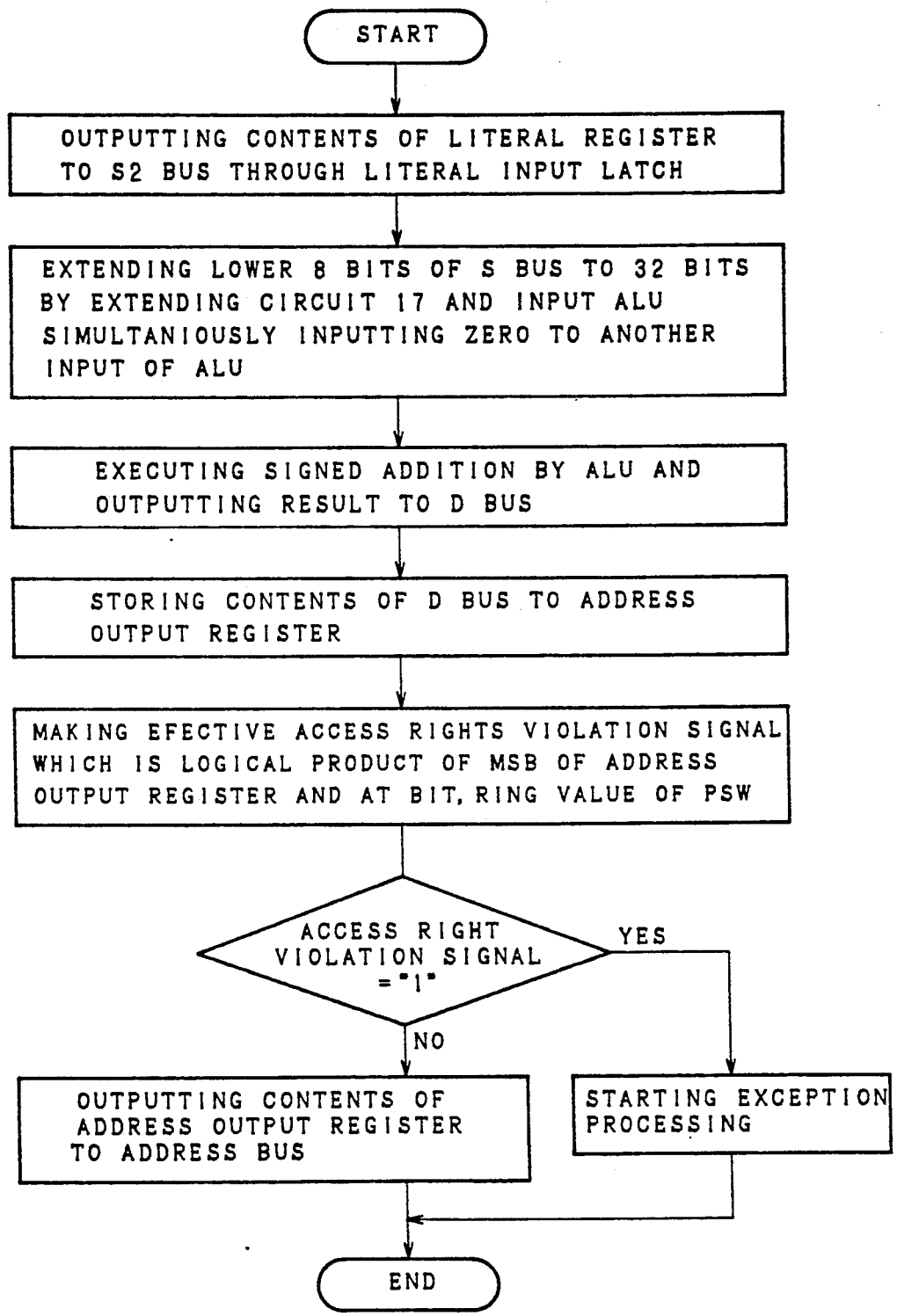

DATA PROCESSOR IMPLEMENTING A TWO'S COMPLEMENT ADDRESSING TECHNIQUE

This is a continuation Ser. No. 07/601,601, filed Oct. 18, 1990, now abandoned. which is a continuation of application Ser. No. 171,982, filed Mar. 23, 1988, now abandoned.

BACKGROUND OF THE INVENTION

1. Field of the Invention

This invention relates to a data processor, more particularly, to a data processor which easily and optionally extends an address space comprised of a user area and a supervisor area by providing the supervisor area with a memory protective function, i.e., two-level memory protective functions, in the actual storage environment.

2. Description of the Prior Art

FIG. 1 is a schematic diagram of the address space of a conventional data processor which is provided with memory having addresses on a 1-byte basis, where these addresses respectively have a certain address space expressed by unsigned binary notation expressing absoluteness. Address values of address space shown in FIG. 1 are expressed by the digit notation.

FIG. 1 denotes in its right-side a practical system that has both the supervisor area and the user area extended when the address space of a data processor is extended to 64 bits. The address space containing 4 giga-bytes denoted by unsigned 32-bit binary notation (shown to the left) is discretely provided to the supervisor area which substantially corresponds to the upper 2 giga bytes made available for the supervisor as well as the user area which substantially corresponds to the lower 2 giga bytes made available for the user. When employing the above constitution, either the supervisor or the user can use the user area, whereas only the supervisor is allowed to use the supervisor area in order to securely protect memory. A technique which protects memory by dividing memory into a plurality of address space based on an idea similar to that shown in FIG. 1 is described in "VAX Architecture Handbook", Section 7, compiled by Education Department, Japan Digital Equipment Co., Ltd.

As shown in FIG. 1, if the address space expressed by unsigned binary notation is divided into the supervisor area and the user area, when extending the address space, the user area is split into two parts in the manner of sandwiching the supervisor area. This makes it quite difficult for any conventional data processor to extend the address space.

Furthermore, since in any conventional data processor, all the supervisor areas are present in teh address space having large values, when directly designating any address in the supervisor area, a longer code length is needed for designating specific addresses.

SUMMARY OF THE INVENTION

The present invention overcomes those problems mentioned above by providing a novel data processor which is provided with means for extending the address space without cutting off the supervisor area from the user area by allowing the address space to extend itself in two directions.

Furthermore, addresses can be directly designated by applying a specific address value having a short bit length in conjunction with the supervisor area.

The data processor related to the invention accesses data in memory with an address value expressed by signed binary notation based on the extension of twos complement in order that the address value having the absolute value of the maximum negative and the address value having the absolute value of the maximum positive can be prevented from being wrapped around each other. Furthermore, the data processor related to the invention is provided with hardware which extends the signed address value expressed by a small bit number. The data processor inhibits accessing of the supervisor area when applying the user mode by appropriating the address space expressed by the positive address value for the user area and approximating the address space expressed by the negative address value for the supervisor area so that memory contents can securely be protected.

In summary, the data processor related to the invention accesses data in memory with an address value expressed by signed binary notation based on the extension of twos compliment, and as a result, the address value having the absolute value of the maximum negative and the address value having the absolute value of the maximum positive can be prevented from being wrapped around each other. Consequently, the positive and negative address space can optionally be extended in the direction of greater absolute value. As a result, both the positive address space and the negative address space can securely be extended without being split from each other after executing expansion of the address space.

The data processor related to the invention extends a address value expressed by a small bit width to the required bit width using sign extending hardware.

The data processor related to the invention checks the access right by judging the positive address value denoting the address space of the user area and the negative address value denoting the address space of the supervisor area merely by one bit of the most significant bit of address data and then comparing these to the processor mode. If violation of the access right is detected, an exception is generated.

The above and further objects and features of the invention will more fully become apparent from the detailed description with the accompanying drawings that follow.

BRIEF DESCRIPTION OF THE DRAWINGS

FIG. 6 is the operation flowchart denoting the sequence of executing the signed addition instruction by the instruction-execution control unit.

DESCRIPTION OF THE PREFERRED EMBODIMENTS

Referring now more particularly to the appended drawings, some of preferred embodiments of the data processor related to the invention are described below.

Figure 1:
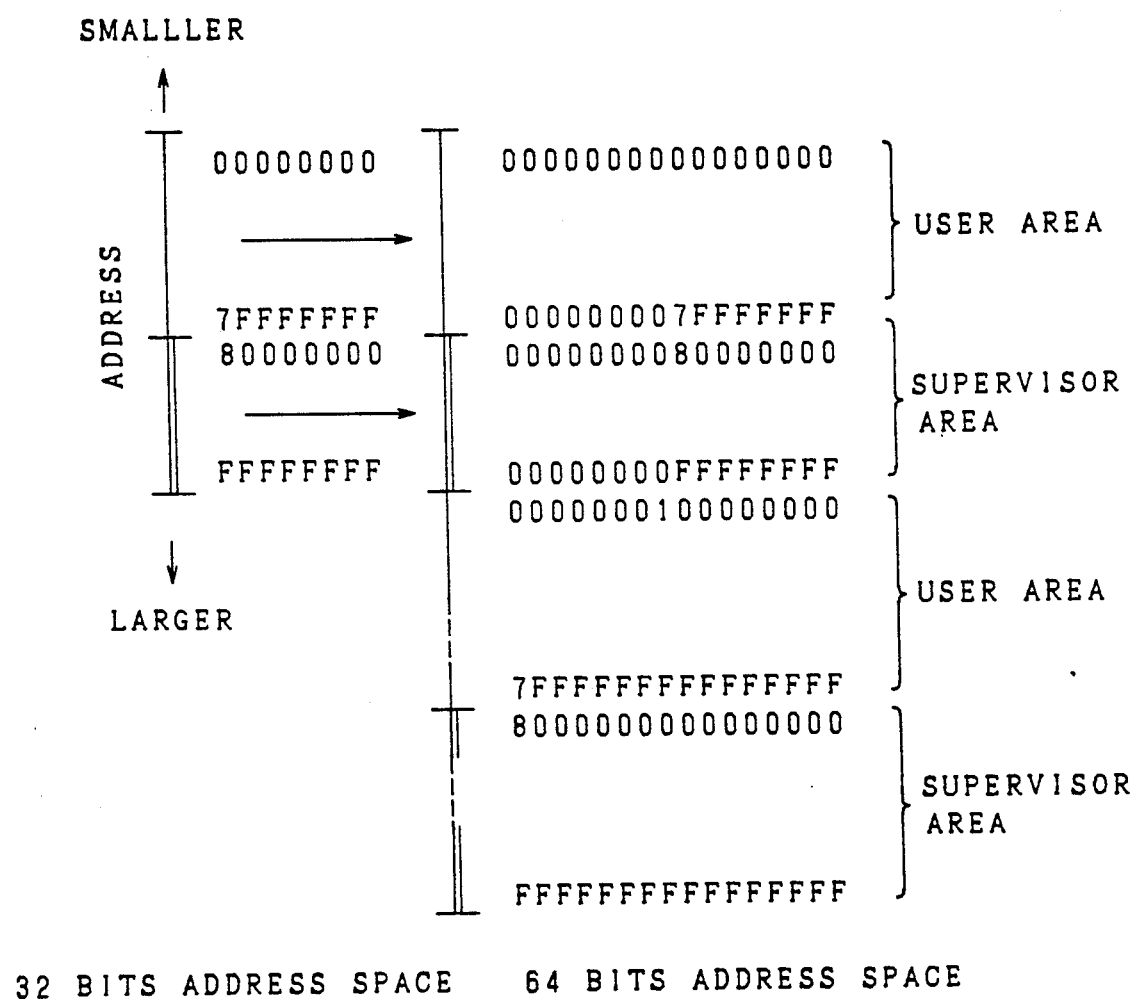
FIG. 1 is the schematic diagram denoting the address space of a conventional data processor and the method of extending the user area and the supervisor area when extending the address space.
Figure 2:
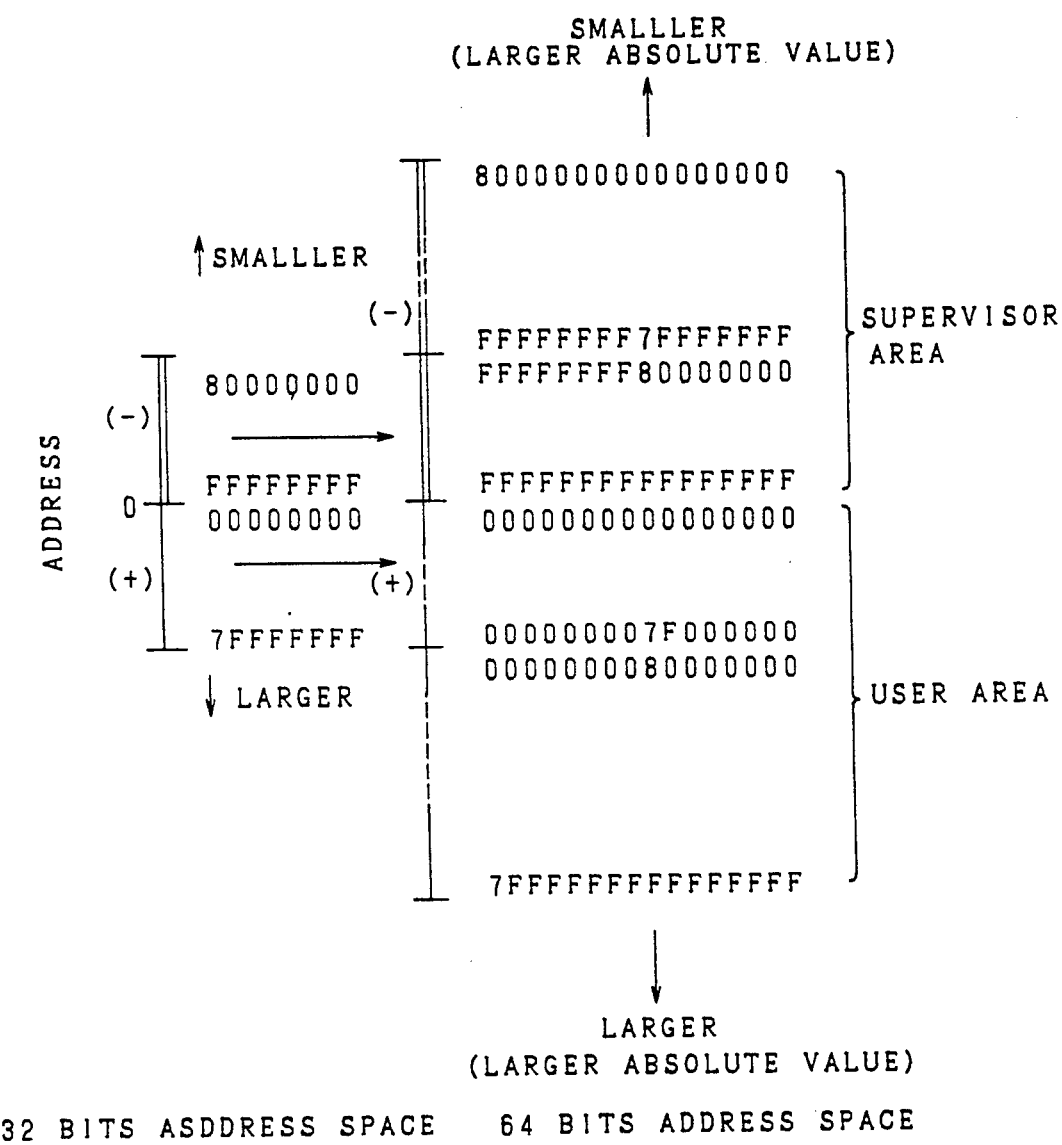
FIG. 2 is the schematic diagram denoting the address space of the data processor related to the invention and the method of extending the user area and the supervisor area when extending the address space.

FIG. 2 denotes the address space of the data processor related to the invention, which provides memory with addresses on a 1-byte basis, while memory has a certain address space in which each address is expressed by signed binary notation expressed by twos compliment. The address value shown in FIG. 2 is expressed by the hexadecimal digit notation.

The right-side of FIG. 2 denotes how the supervisor area and the user area can respectively be extended in the process of extending the address space of the data processor into 64 bits, in which the address space is discretely provided with the supervisor area having negative address values which allows the supervisor to use 4 gigabytes of address space expressed by the 32-bit signed binary notation shown in the left side of the drawing and the user area having positive address values which allows the user to use it.

The data processor related to the invention allows the supervisor area to extend itself in the direction of addresses having large absolute negative values and allows the user area to extend itself in the direction of addresses having large absolute positive values. Consequently, either of these areas can be extended without being split.

Figure 3:
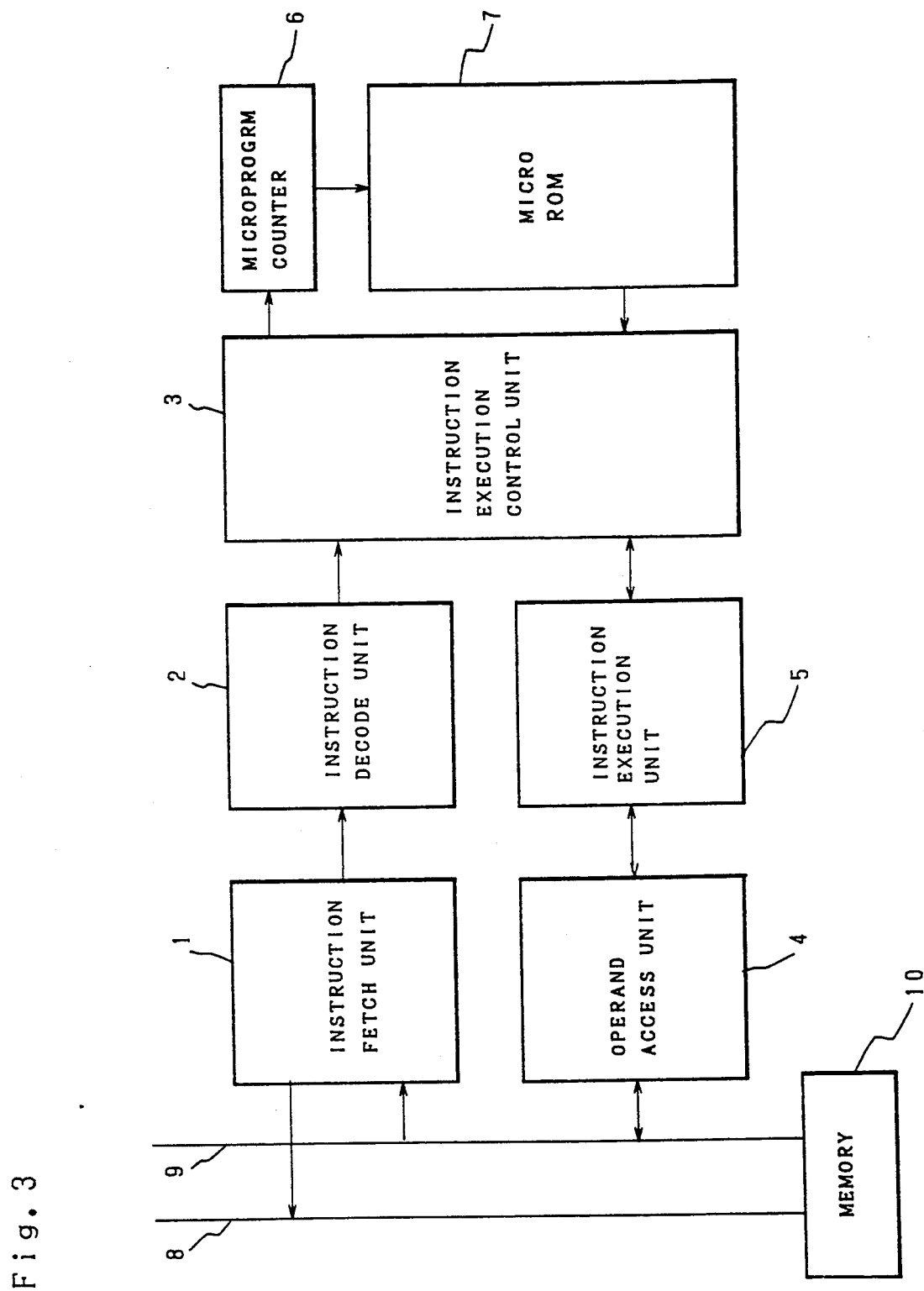
FIG. 3 is the block diagram of a preferred embodiment of the concrete construction of the data processor related to the invention.

FIG. 3 denotes the block diagram of the entire constitution of the data processor related to the invention. The data processor incorporates the following constituents.

An instruction fetch unit 1 delivers addresses to a memory 10 through an address bus 8 to fetch the designated instruction from the memory 10 through a data bus 9.

An instruction decode unit 2 receives the designated instruction from the instruction fetch unit 1 and then decodes it before delivering the decoded data needed for executing the designated instruction to the following unit.

The instruction execution control unit 3, based on those data outputted from the instruction decode unit 2 related to microprogram entry address, general-purpose register number, operand, and data size, outputs the microprogram entry address denoting the foremost address of microprogram executing instructions stored in a micro ROM 7 to a microprogram counter 6. At the same time, the control unit 3 also controls the instruction execution unit 5, allowing it to execute the designated instruction in response to the micro instruction outputted from micro ROM 7 based on the address sequentially designated by the microprogram counter 6 and also in response to other data outputted from the instruction decode unit 2.

An operand access unit 4 outputs the designated address to the address bus 8 if the designated operand is stored in memory when executing the designated instruction so that the operand can be fetched through the data bus 9. The operand access unit 4 also outputs the addresses of memory to the address bus 8 if the operand should be stored in the memory 10 to allow the address bus 8 to deliver the operand to the data bus 9.

Figure 4:
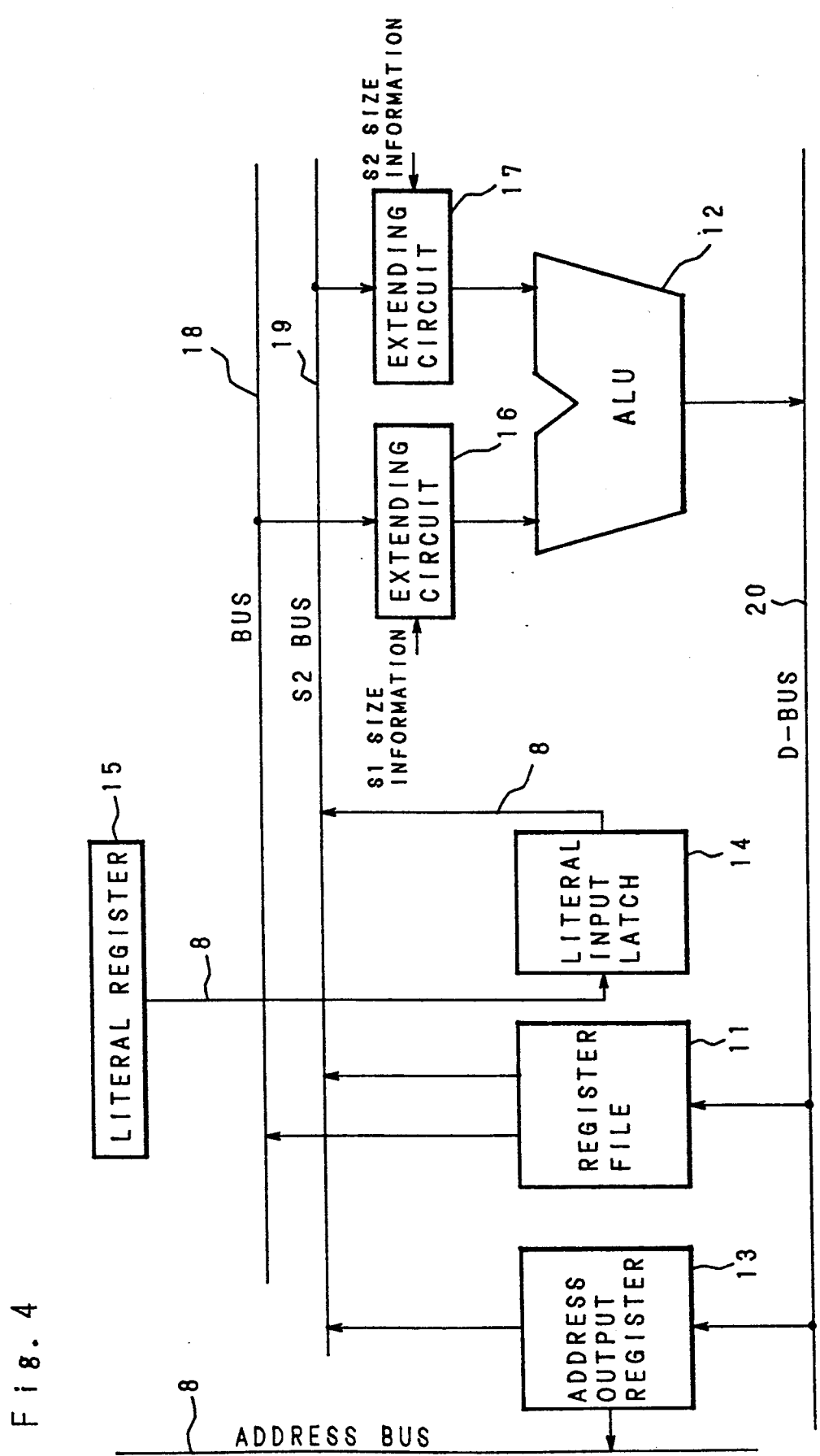
FIG. 4 is the block diagram of the detailed constructions of the instruction execution unit and part of the instruction-execution control unit as well as part of the operand accessing mechanism shown in FIG. 3.

FIG. 4 denotes the details of the instruction execution unit 5, part of the instruction-execution control unit 3, and part of the operand access unit 4, respectively. A register file 11 stores data to be converted into an operand.

An arithmetic logical unit (ALU) 12 executes logical operations including addition of two binaries and a logical product in conjunction with 2-bit strings, for example.

Expansion circuits 16 and 17 respectively implement either zero-expansion or signed expansion into the data size which is dealt by the ALU 12 when feeding data having a predetermined size less than that of the ALU 12 to the ALU 12 itself.

Address output register 13 which is provided inside of the operand access unit 4, outputs the designated address to the address bus 8.

An 8-bit literal input latch 14 which is provided inside of the instruction execution control unit 3, first latches literal values from the literal register 15 storing literal values generated by the instruction decode unit 2 and then outputs those literal values to an S2-bus 19.

Buses 18 through 20 respectively interconnect the register file 11 and the ALU 12.

D-bus 20 is also connected to the address output register 13, whereas the S2-bus 19 is connected to the address output register 13 and the literal input latch 14, respectively.

Figure 5:
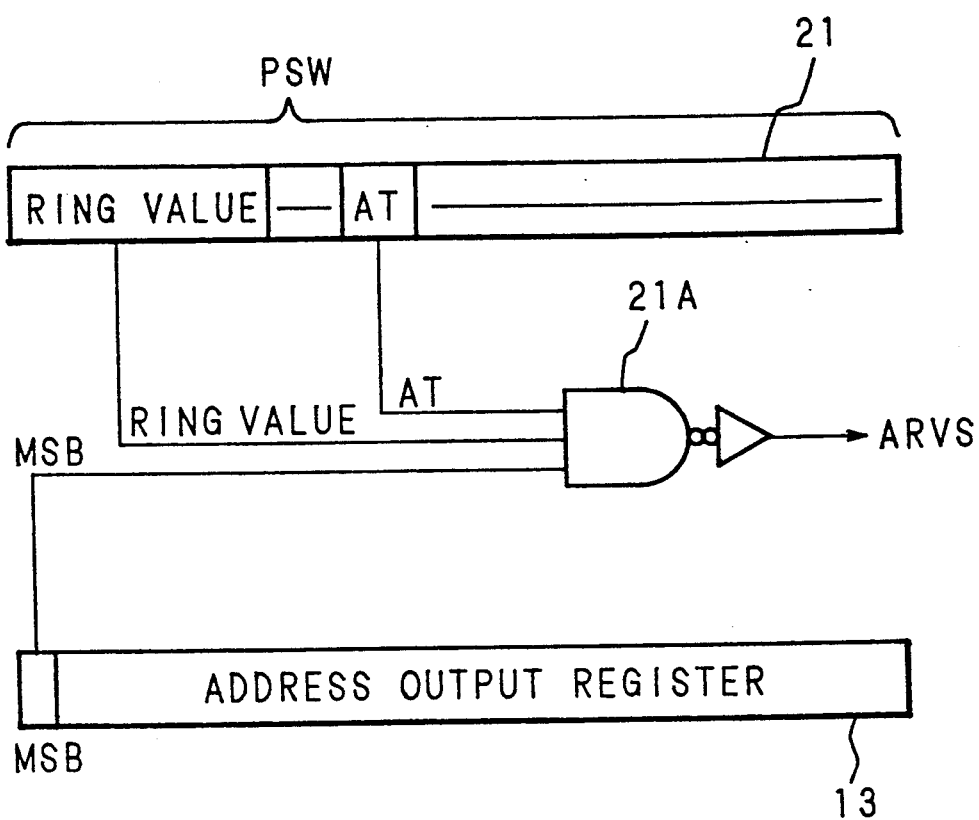
FIG. 5 is the block diagram denoting the construction of the checking mechanism for checking violation of access protection when the operand accesses to the memory.

FIG. 5 denotes for mechanism for checking the violation against access protection when an operand is accessed from the memory 10. When accessing an operand, the mechanism shown in FIG. 5 outputs access right violation signal ARVS which indicates whether accessing operation is correctly executed, or not, by allowing an AND gate 21A to receive access protection mode bit AT stored in PSW 21 denoting the state of the data processor, ring value denoting the privileged level of the task under execution, and the AND condition of the most significant bit MSB of the address output register 13, respectively.

Next, operation of the data processor related to the invention is described below.

First, the operation of this data processor is explained by referring to sequential operations until the 8-bit literal value designated among the instruction codes is eventually outputted to the address bus 8 after being extended to a 32-bit code so that an operand can be fetched from the address designated by the above 8-bit literal value.

The instruction fetch unit 1 shown in FIG. 3 fetches the designated instruction from the memory 10, and then the instruction decode unit 2 decodes the received instruction before delivering the decoded result to the instruction execution control unit 3. This control unit 3 then stores the literal value generated from the decoded result in the literal register 15. Simultaneously, the instruction execution control unit 3 reads out the micro instruction by providing the microprogram counter 6 with the entry address of microprogram routine which outputs the signed extended literal value stored in micro-ROM 7 to the address bus 8 as an address. FIG. 6 denotes the operation flowchart showing for a sequence of executing the signed addition instruction by means of the instruction execution control unit 3. As soon as the address value obtained by the signed expansion of the literal value is received by the address output register 13, the access right violation signal ARVS becomes effective. Consequently, if the access protection mode bit AT remains "1", it indicates that access protection is executed. If the ring value remains "1", it express user mode. If the most significant bit MSB of the address output register 13 remains "1" which is substantially the negative address value, the instruction execution control unit 3 then judges that the task of the user mode is about to access the memory area of the supervisor mode. Simultaneously, the access right violation signal ARVS is converted into "1", and then the instruction execution control unit 3 sets the entry address of the microprogram routine activating an exception process to the microprogram counter 6.

Next, another preferred embodiment of the data processor related to the invention is described below.

The first preferred embodiment described above has presented the case of extending a 32-bit address space to a 64-bit address space. However, this merely express an example, and thus, the scope of the address-space-expansion is optional. In other words, a address may optionally be extended from a certain optional bit to any optional bit desired. Either a logical address or a physical address may make up the desired addresses. Furthermore, the user area and the supervisor area may respectively constitute the positive address space and the negative address space or vice versa. Furthermore, although the above-described preferred embodiment has presented the case in which the address value is provided with an 8-bit length, any optional bit length may also be introduced.

One of other preferred embodiments of the invention is described in the constitution of PSW, Section 10, and the appendix 3 (Memory Control System as per LIR Specification), of the detailed description of the preceding invention "DATA PROCESSOR", which was filed under the Japanese Patent Application No. 64-247418 (1987), invented by one of the inventors of the present invention.

As is clear from the above description, the data processor related to the present invention allows the address space to extend itself in wider and narrower directions. This in turn allows both the supervisor space and the user space to easily and continuously be extended up to a desired dimension by discretely controlling the address space by dividing it into the supervisor space and the user space, and as a result, the address space can satisfactorily be extended. (FIG. 2)

Furthermore, since the negative address space and the positive address space linearly continue themselves in the negative and positive directions across the zero address which serves as the borderline, the entire address space can evenly be used by converting bit AT designating access protection mode into "0".

Furthermore, since the data processor related to the invention has a mechanism for extending the signed address value, either part of the address value of the user area or part of the address value of the supervisor area can correctly be expressed merely by applying a short bit length. In addition, since this function directly shortens the bit length of the address value designated by a program, the entire code length of the program can also be shortened.

Since the data processor related to the invention securely checks the access right against the supervisor area merely by checking the most significant bit of the address to be accessed, the access right checking circuit can easily be constituted. Furthermore, when checking the access right using a physical address, the data processor can protect memory without complex hardware for converting a logical address into a physical address. when separating the supervisor area from the user area by means of the positiveness and the negativeness of the address value of the physical memory, the supervisor and user respectively use fixed memory means. However, since the dimension of the supervisor area is specified in such fields where the operating system or application is specific, the above system for separating the supervisor area from the user area is particularly effective.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. In a data processor having an instruction execution unit and a decoding unit for decoding instructions, apparatus comprising:
   a memory containing a plurality of memory locations, each location having an address, each address having a maximum bit length;
   means, for sequentially providing a first plurality of addresses for accessing said memory, at least a first of said first plurality of addresses having a number of bits, less than said maximum bit length, each of said first plurality of addresses being an address which is signed;
   a sign extending means coupled to said means for sequentially providing, for receiving at least said first address from said means for sequentially providing, said first address having a bit length which is less than said maximum bit length and extending said first address into an extended address having a bit length equal to said maximum bit length wherein the least significant bits of said extended address are identical to said first address; and
   means, coupled to said memory, and to said sign extending means, for accessing data stored in said memory using addresses selected from the group consisting of signed binary numbers, at least a first of said numbers being the two's complement of a second of said numbers.

2. A method for storing programs and data information in a computer, having an electronic memory containing a plurality of memory locations, said memory locations having corresponding addresses, said electronic memory including a supervisor area usable only by a supervisor and a user area usable by a supervisor or a user, said electronic memory having an initial number of addressable memory locations, the method comprising the steps of:
   storing a first group of said programs and data information in a first portion of said electronic memory by providing an address to said electronic memory, each of said addresses being an address which is signed, said first portion of said electronic memory being a supervisor area, the addresses for said first portion of said electronic memory having a predetermined bit in a first state;
   storing a second group of programs and data information in a second portion of said electronic memory by providing an address to said electronic memory, each of said addresses being an address which is signed, said second portion of said electronic memory being a user area, the addresses for said second portion of said electronic memory having said predetermined bit in a second state; and extending said user area of said electronic memory and said supervisor area of said electronic memory by providing additional memory locations for said user area and providing additional memory locations for said supervisor area to produce an extended user area and an extended supervisor area, without splitting said user area and without splitting said supervisor area, the addresses for said user area, after said extending, being contiguous addresses and including all addresses which were in said user area before said extending and the addresses for said supervisor area, after said extending, being contiguous addresses and including all the addresses which were in said supervisor area before said extending.

3. Apparatus for storing programs and data information in a computer, having an electronic memory containing a plurality of memory locations, said memory locations having corresponding addresses, said electronic memory including a supervisor area usable only by a supervisor and a user area usable by a supervisor or a user, said electronic memory having an initial number of addressable memory locations, the apparatus comprising:

means for storing a first group of said programs and data information in a first portion said electronic memory by providing an address to said electronic memory, each of said addresses being and address which is signed, said first portion of said electronic memory being a supervisor area, the addresses for said first portion of said electronic memory having a predetermined bit in a first state;

means for storing a second group or programs and data information in a second portion of said electronic memory by providing an address to said electronic memory, each of said addresses being an address which is signed, said second portion of said electronic memory being a user area, the addresses for second portion of said electronic memory having said predetermined bit in a second state; and means for extending said user area of said electronic memory and said supervisor area of said electronic memory by providing additional memory locations for said user area and providing additional memory locations for said supervisor area to produce an extended user and an extended supervisor area, without splitting said user area and without splitting said supervisor area, the addresses for said user, after said extending, being contiguous addresses and including all addresses and including all addresses which were in said user area before said extending and the addresses for said supervisor area, after extending, being contiguous addresses and including all the addresses which were in said supervisor area before said extending.

4. In a data processor unit having an instruction execution unit and a decoding unit for decoding instructions, and a memory containing a plurality of memory locations, each location having an address, each address having a maximum bit length, a method comprising the steps of:

sequentially providing a first plurality of addresses to said memory, at least a first of said first plurality of addresses having a predetermined number of bits less than said maximum bit length, each of said first plurality of addresses being an address which is signed;

receiving at least said first address in a signed extending means, said first address having a bit length which is less than said maximum bit length;

extending said first address, in said sign extending means, into an extended address having a bit length equal to said maximum bit length, wherein the least significant bits of said extended address are identical to said first address; and accessing data stored in said memory using memory addresses selected from the group consisting of signed binary numbers, at least first of said numbers being the two's compliment of a second of said numbers, said memory addresses including at least said extended address.

* * * * *